United States Patent [19]

Bice et al.

[11] Patent Number: 5,077,000
[45] Date of Patent: Dec. 31, 1991

[54] METHOD OF PREPARING A REACTOR COOLANT PUMP FOR VACUUM DEGASIFICATION OF A REACTOR COOLANT SYSTEM

[75] Inventors: Charles D. Bice, Clinton Twp., Butler County; Clifford H. Campen, Plum Boro, both of Pa.

[73] Assignee: Westinghouse Electric Corp., Pittsburgh, Pa.

[21] Appl. No.: 594,761

[22] Filed: Oct. 9, 1990

Related U.S. Application Data

[62] Division of Ser. No. 294,331, Jan. 6, 1989, Pat. No. 4,981,304.

[51] Int. Cl.[5] .............................................. G21C 19/42
[52] U.S. Cl. ...................................... 376/308; 376/203; 376/310; 74/18; 74/18.1; 277/1; 277/212 FB
[58] Field of Search ................... 277/1, 93 R, 93 SD, 277/200, 212 FB, 220, 237 A; 74/18, 18.1; 403/50, 51; 376/203, 308, 310, 316

[56] References Cited

U.S. PATENT DOCUMENTS

| | | |
|---|---|---|
| 2,226,388 | 12/1940 | Richter . |
| 2,620,208 | 12/1952 | Patch et al. . |
| 3,083,698 | 4/1960 | Price et al. . |
| 3,408,091 | 10/1968 | Zystra . |
| 3,506,289 | 4/1970 | Gottshald ................. 277/212 FB |
| 3,527,511 | 8/1970 | Whittle . |
| 3,611,816 | 10/1971 | Wedekind ........................ 403/50 |
| 3,638,503 | 2/1972 | Stipanovic et al. .................. 74/18 |
| 3,704,894 | 12/1972 | Didszuhn ................. 277/212 FB |
| 3,724,179 | 4/1973 | Leinfelt . |
| 3,744,324 | 7/1973 | Perkins ............................. 74/18.1 |
| 3,932,212 | 1/1976 | Gross et al. ...................... 376/308 |
| 4,293,382 | 10/1981 | Ohsumi et al. .................. 376/308 |
| 4,369,979 | 1/1983 | Krude et al. ........................ 74/18 |
| 4,410,188 | 10/1983 | Copes ............................. 277/93 R |
| 4,465,285 | 8/1984 | Toyoda et al. . |
| 4,533,514 | 8/1985 | Yamamoto et al. ............. 376/308 |
| 4,558,869 | 12/1985 | Grove et al. ............. 277/212 FB X |
| 4,647,425 | 3/1987 | Battaglia et al. ............. 376/310 X |
| 4,712,800 | 12/1987 | Johnson ................................ 277/1 |
| 4,731,501 | 3/1988 | Clark et al. . |
| 4,768,923 | 9/1988 | Baker . |
| 4,819,919 | 4/1989 | Taylor .................... 277/212 FB X |
| 4,847,041 | 7/1989 | Fornof ......................... 376/310 X |

FOREIGN PATENT DOCUMENTS

| | | |
|---|---|---|
| 550651 | 9/1956 | Belgium . |
| 1209375 | 1/1966 | Fed. Rep. of Germany . |
| 1245236 | 7/1967 | Fed. Rep. of Germany . |
| 22094 | 2/1979 | Japan ............................... 376/310 |
| 45399 | 10/1985 | Japan ............................... 376/308 |
| 949239 | 2/1964 | United Kingdom . |
| 2134994 | 8/1984 | United Kingdom . |

Primary Examiner—William A. Cuchlinski, Jr.
Assistant Examiner—Scott W. Cummings

[57] ABSTRACT

An auxiliary flexible vacuum seal for preparing a reactor coolant pump for vacuum degasification of the reactor coolant system employs a flexible boot member having a pair of longitudinally-displaced opposite open end portions and a pair of side-by-side longitudinally-extending side portions in the form of flanges defining a split in the boot member along a side thereof and extending between the open end portions for allowing flexing of the boot member between open and closed side configurations to permit its installation and removal on and from the pump. The seal also employs clamping brackets and fasteners for releasably and sealably clamping together the flanges of the boot member at the split to retain the boot member in its closed configuration. The seal further includes a pair of circumferentially-extending sealing portions formed integrally on the interior of the boot member at opposite open end portions thereof for sealably engaging the pump when the boot member is flexed to its closed configuration to thereby permit generation of a vacuum seal condition between the boot member and the pump. Preferably, a boot support member is disposed within the boot member between the boot member and the pump for supporting the boot member when in its closed configuration.

4 Claims, 7 Drawing Sheets

METHOD OF PREPARING A REACTOR COOLANT PUMP FOR VACUUM DEGASIFICATION OF A REACTOR COOLANT SYSTEM

This is a Divisional application under 37 CFR 1.60 of pending prior application Ser. No. 07/294,331, filed Jan. 6, 1989, now U.S. Pat. No. 4,981,304.

CROSS REFERENCE TO RELATED APPLICATIONS

Reference is hereby made to the following copending applications dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982, now U.S. Pat. No. 4,587,076, issued May 6, 1986.

2. "Nuclear Reactor Coolant Pump Impeller/Shaft Assembly" by L. S. Jenkins, assigned U.S. Ser. No. 761,447 and filed Aug. 1, 1985, now U.S. Pat. No. 4,690,612, issued Sept. 1, 1987.

3. "Improved Shaft Seal" by K. P. Quinn, assigned U.S. Ser. No. 739,745 and filed May 31, 1985, now U.S. Pat. No. 4,693,481, issued Sept. 15, 1987.

4. "Reactor Coolant Pump Hydrostatic Sealing Assembly With Improved Hydraulic Balance" by R. F. Guardiani et al, assigned U.S. Ser. No. 063,331 and filed June 17, 1987, now U.S. Pat. No. 4,838,559, issued June 13, 1989.

5. "Reactor Coolant Pump Sealing Surface With Titanium Nitride Coating" by G. Zottola, assigned U.S. Ser. No. 035,832 and filed Apr. 8, 1987, now U.S. Pat. No. 4,871,297, issued Oct. 3, 1989.

6. "Reactor Coolant Pump Hydrostatic Sealing Assembly With Externally Pressurized Hydraulic Balance Chamber" by R. F. Guardiani, assigned U. S. Ser. No. 091,224 and filed Aug. 31, 1987, now U.S. Pat. No. 4,848,774, issued July 18, 1989.

7. "Reactor Coolant Pump Shaft Seal Utilizing Shape Memory Metal" by D. J. Janacko assigned U.S. Ser. No. 197,174 and filed May 23, 1988.

8. "Reactor Coolant Pump Auxiliary Seal For Reactor Coolant System Vacuum Degasification" by J. D. Fornof, assigned U.S. Ser. No. 222,649 and filed July 21, 1988.

BACKGROUND OF THE INVENTION

1. Field of the Invention

The present invention relates generally to shaft seals and, more particularly, is concerned with a reactor coolant pump auxiliary flexible vacuum seal for reactor coolant system vacuum degasification.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in U.S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

Thus, the sealing assemblies in the reactor coolant pumps are designed to hold high positive coolant pressures. This fact has raised some concerns about possibility of damage being done to the reactor coolant pumps during reactor coolant system vacuum degasification. Procedures for vacuum degasification of the reactor coolant system are described in U.S. Pat. No. 4,647,425 to Battaglia et al, which is assigned to the same assignee as the present invention and is hereby incorporated by reference. Basically, in vacuum degasification of the reactor coolant system a vacuum or negative pressure is imposed on the system and thus on the reactor coolant pumps. This, in effect, pressurizes the pumps in reverse. One major concern is that reverse pressurization might draw the water used to cool the pump sealing assemblies back into the pump sealing assemblies by a reverse flow of the water through filters which might bring contamination in the form of dirt and foreign matter along with the water from the filters into the sealing assemblies. Then, when the pumps are restarted after conclusion of vacuum degasification, the sealing assemblies may become damaged by the presence of the contamination therein.

Consequently, a need exists for an effective way to prevent reverse pressurization of the reactor coolant pumps so as to eliminate these concerns about possible damage to the pump sealing assemblies.

SUMMARY OF THE INVENTION

The present invention provides a reactor coolant pump auxiliary flexible vacuum seal designed to satisfy the aforementioned needs. The auxiliary flexible vacuum seal of the present invention provides a simple and effective way to prepare the reactor coolant pumps so that the reactor coolant system can be vacuum degasified without applying a reverse pressure to the pump sealing assemblies. The auxiliary flexible vacuum seal is an external, temporary seal that would be installed prior to the start of vacuum degasification between the pump sealing housing and shaft, and then removed after degasification is completed. The auxiliary seal accepts the entire reverse pressure, thus preventing any possible damage to the primary, secondary and tertiary pump sealing assemblies of the pump.

The auxiliary flexible vacuum seal of the present invention is an alternative to the invention illustrated and described in the eighth patent application cross-referenced above. The flexible vacuum seal offers several advantages over the rigid segmented seal of the cross-referenced application. First, the flexible seal is embodied primarily in the form of a single flexible split boot member with a pair of axially-spaced integral sealing portions, preferably in the form of ring elements, resulting in fewer parts to handle and less sealing length to be concerned with. Second, all parts of the flexible seal are disposable, thus minimizing decontamination and storage requirements. Third, the flexible seal is easier to manipulate within the limited space of the motor stand. Fourth, deviations in concentricity between the shaft and seal housing would be of no concern with the flexible seal. Fifth, the flexible seal fits with the shaft in either its axially-displaced coupled or uncoupled positions. Sixth, the flexible seal can be installed without the need to remove any of the parts of the pump other than some piping and associated connections.

Accordingly, the present invention is directed to an auxiliary flexible vacuum seal useful in a reactor coolant pump for preparing the pump for vacuum degasification of the reactor coolant system. The flexible vacuum seal comprises: (a) a flexible boot member having a pair of longitudinally-displaced opposite open end portions and a pair of side-by-side longitudinally-extending side portions defining a split in the boot member along a side thereof and extending between the open end portions for allowing flexing of the boot member between open and closed side configurations to permit its installation and removal on and from the pump; (b) means for releasably and sealably clamping together the side portions of the at the split to retain the boot member in its closed configuration; and (c) a pair of circumferentially-extending sealably portions on the interior of the boot member at the opposite open end portions thereof for sealably engaging the pump when the boot member is installed and flexed to its closed configuration to thereby permit generation of a vacuum seal condition between the boot member and the pump.

Further, the flexible seal includes a boot support member disposable within the boot member between the boot member and the pump for supporting the boot member when in its closed configuration. More particularly, the boot support member is annular in shape and composed of a pair of semi-annular parts. The support member also has an upper surface conformed in shape to that of an intermediate portion of the boot member located between its opposite end portions for engagably supporting the boot member at its intermediate portion. Further, the boot support member has a lower surface conformed in shape to that of the pump for mounting the support member thereon.

The boot member of the flexible seal includes a bowl-shaped body having the opposite end portions and defining a hollow cavity. The cavity is open at the opposite end portions and openable at the split defined in the body by the side portions of the boot member. The sealably engaging portions on the boot member at the opposite open end portions thereof are preferably rings projecting radially inwardly and formed integrally on the body of the boot member. In the alternative, these sealably engaging portions may be the interior surface of the boot member itself at its opposite open end portions. The side portions of the boot member are in the form of a pair of radially outward-projecting and longitudinally-extending flanges on the body along opposite sides of the split and disposed in side-by-side contacting relation when the boot member is in its closed configuration. The clamping means of the flexible seal includes a pair of brackets mountable along outer sides of said flanges on the boot member body, and a plurality of fasteners extendible through the brackets and flanges therebetween and being operable for drawing the brackets toward one another and withdrawing the brackets away from one another for clamping and releasing the flanges.

The present invention is also directed to a method of preparing a reactor coolant pump for vacuum degasification of a reactor coolant system. The preparing method comprises the steps of: (a) sealing a seal housing of the reactor coolant pump by installing a longitudinally split boot member about a portion of the seal housing and about a shaft extending through the housing; (b) reversing the pressure of the reactor coolant system at start of vacuum degasification of the reactor coolant system, the sealing of the pump seal housing preventing damage to sealing assemblies therein by the reversing of reactor coolant system pressure; (c) terminating reversing of the reactor coolant system pressure at completion of vacuum degasification of the reactor coolant system; and (d) unsealing the pump seal housing of the reactor coolant pump by removing the split boot member. Further, the sealing includes stretching the split boot member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

PRIOR ART REACTOR COOLANT PUMP

Figure 1:
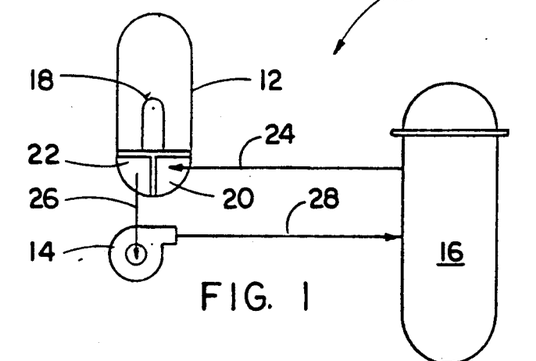
FIG. 1 is a schematic representation of one cooling loop of a conventional nuclear reactor coolant system which includes a steam generator and a reactor coolant pump connected in series in a closed coolant flow circuit with the reactor core.

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 2:
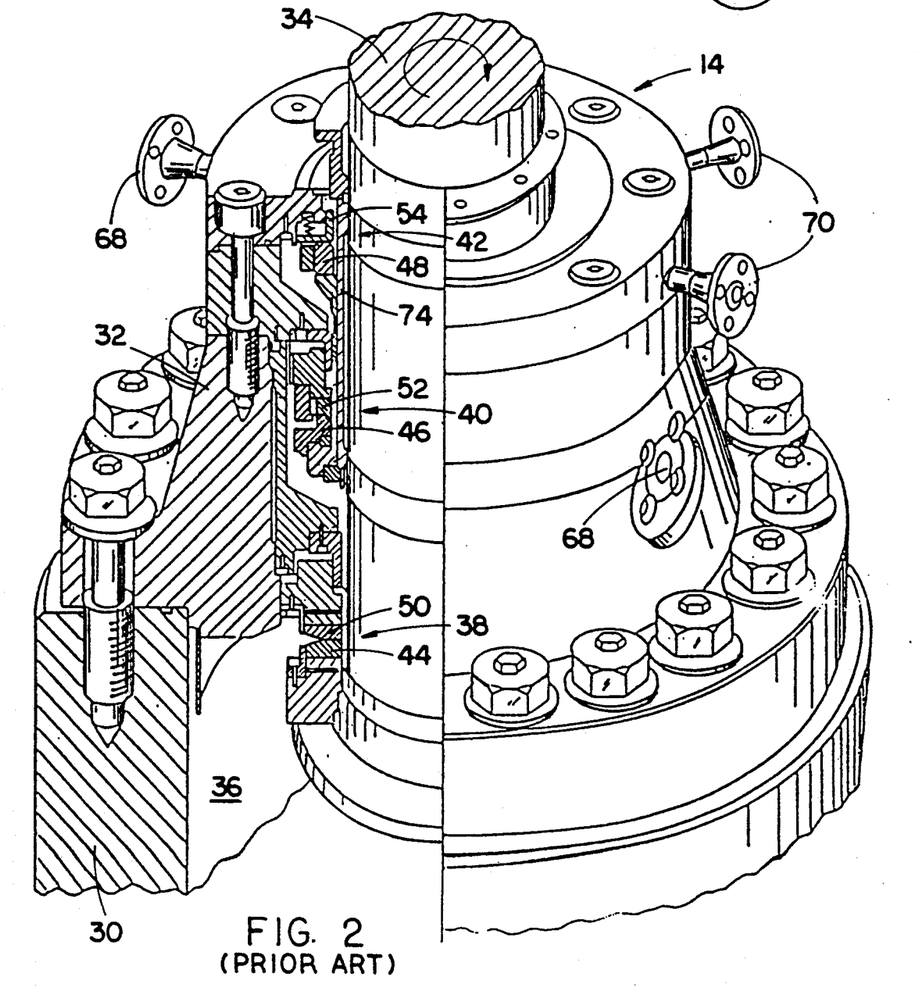
FIG. 2 is a cutaway perspective view of the shaft seal section of a reactor coolant pump, illustrating in an axial sectional form the seal housing and the lower primary, middle secondary and upper tertiary sealing assemblies which are disposed within the seal housing and surround the pump shaft in this section of the pump.
Figure 3:
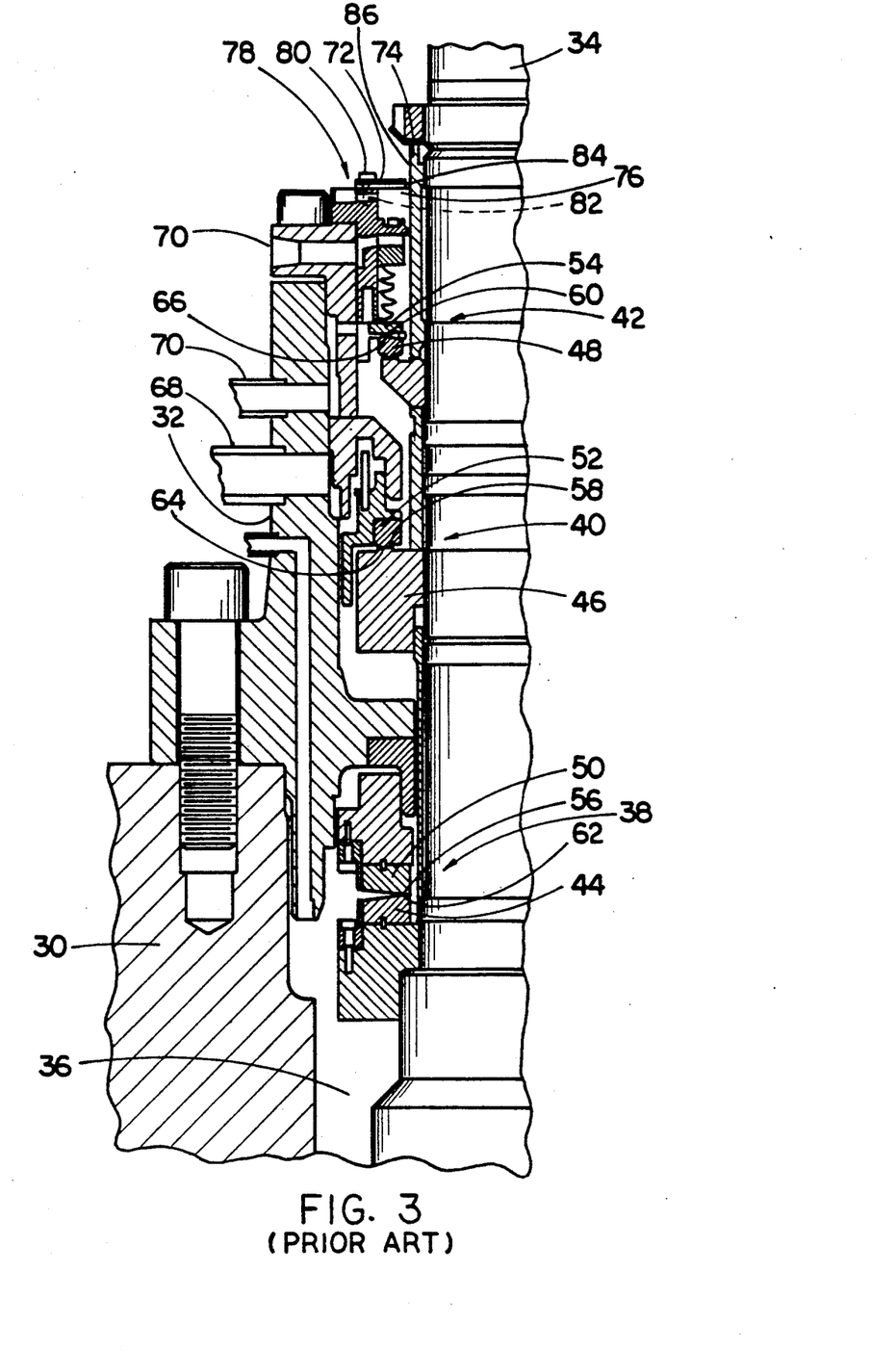
FIG. 3 is an enlarged view of the axially sectioned seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas with minimum pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30 The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas leakoff ports 70 accommodate coolant fluid leakoff from secondary and tertiary sealing assemblies 40,42.

Also, the reactor coolant pump 14 has an annular fluid blocking splash guard 72 disposed adjacent to an annular collar 74 attached to the pump shaft 34. The splash guard 72 is seated within an annular recess 76 formed about an upper portion 78 of the seal housing 32. Screws 80 (only one of which is shown) threaded into holes 82 tapped in the seal housing portion 78 serve to attach the splash guard 72 to the seal housing 32 and retain it in the recess 76 such that an inner periphery 84 of the splash guard 72 is disposed close to the exterior cylindrical surface 86 of the shaft collar 74.

RCP AUXILIARY FFLEXIBLE VACUUM BOOT SEAL OF THE PRESENT INVENTION

In accordance with principles of the present invention, an auxiliary flexible vacuum seal 88 can be temporarily installed, without the necessity of removing any parts of the pump 14 other than for some piping (not shown), to prepare the reactor coolant pump 14 for reactor coolant system vacuum degasification. Referring now to FIGS. 4 to 15, the auxiliary flexible vacuum seal 88 basically includes a flexible boot member 90, clamping means 92, and upper and lower sealing portions, preferably in the form of ring elements 4,96 (FIG. 8) on the boot member 90. In the alternative, the sealing portions may be the interior surface of the boot member 90 itself at the opposite open end portions thereof since the boot member 90 is stretched when so installed. Also, preferably, the seal 88 includes a boot support member 98. for allowing flexing of the boot member between open and closed side configurations to permit its installation and removal on and from the pump.

Figure 5:
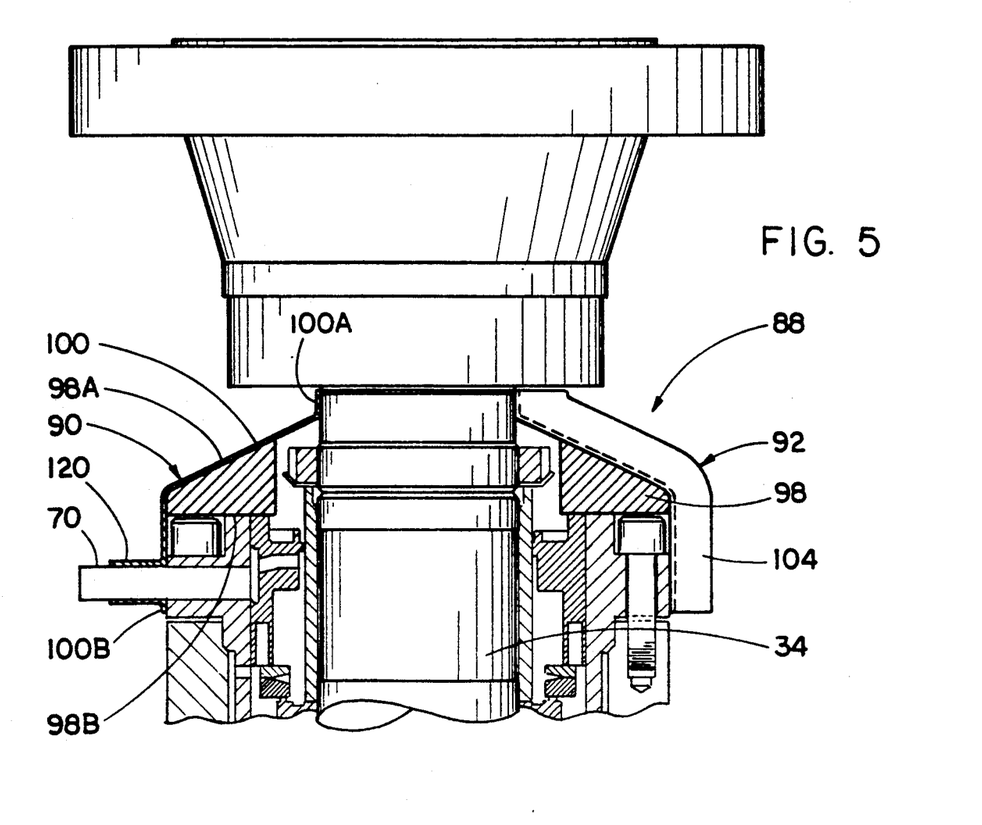
FIG. 5 is an enlarged axial sectional view of a flexible boot member and an annular boot support member of the auxiliary flexible vacuum seal of FIG. 4, also showing in elevational form an upper coupling hub of the pump on the pump shaft above the seal.
Figure 6:
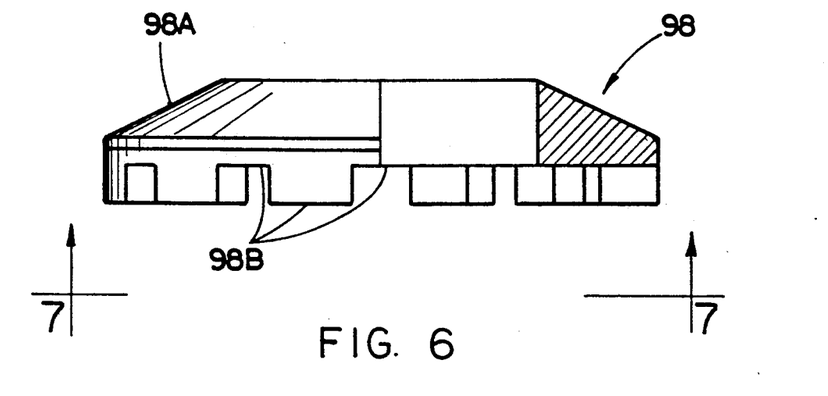
FIG. 6 is an elevational view, partly in axial section, of the annular boot support member of the flexible vacuum seal by itself.
Figure 7:
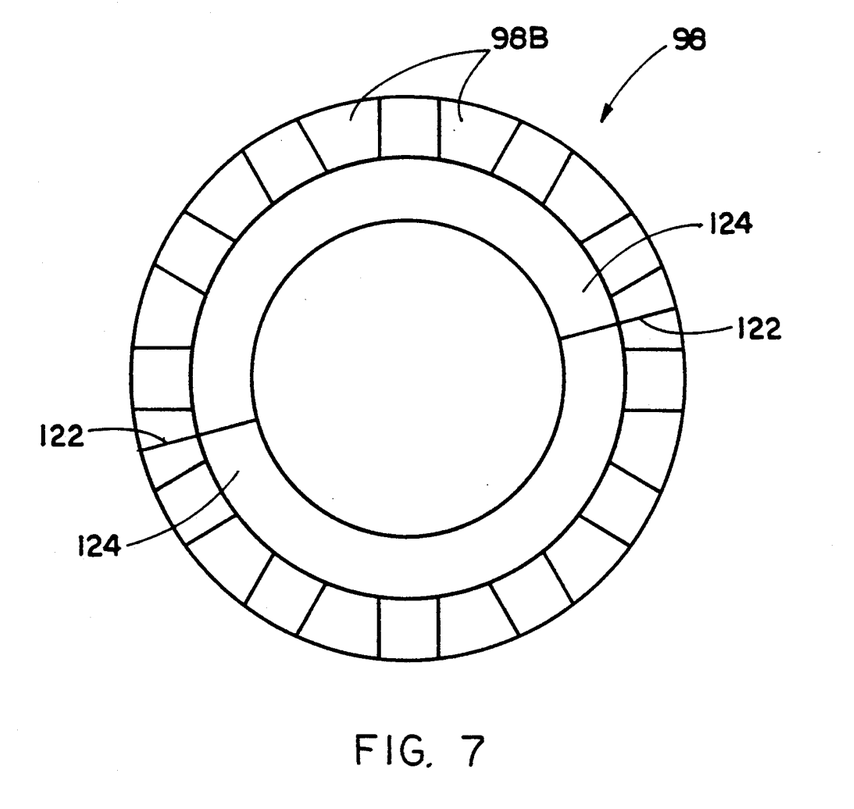
FIG. 7 is a bottom plan view of the boot support member as seen along line 7—7 of FIG. 6.
Figure 8:
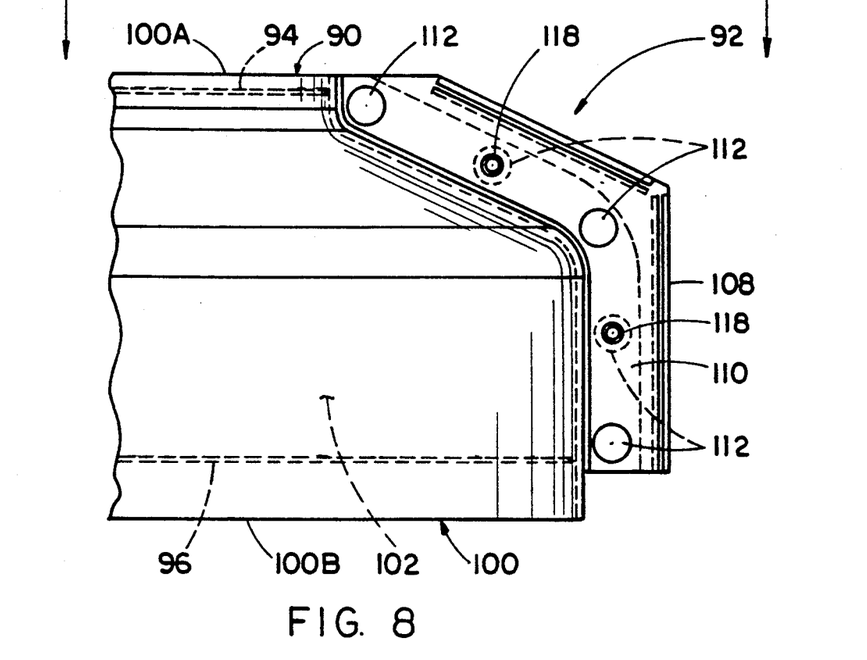
FIG. 8 is an enlarged fragmentary elevational view of the flexible boot member and a pair of clamp members of the flexible vacuum seal of FIG. 5.
Figure 9:
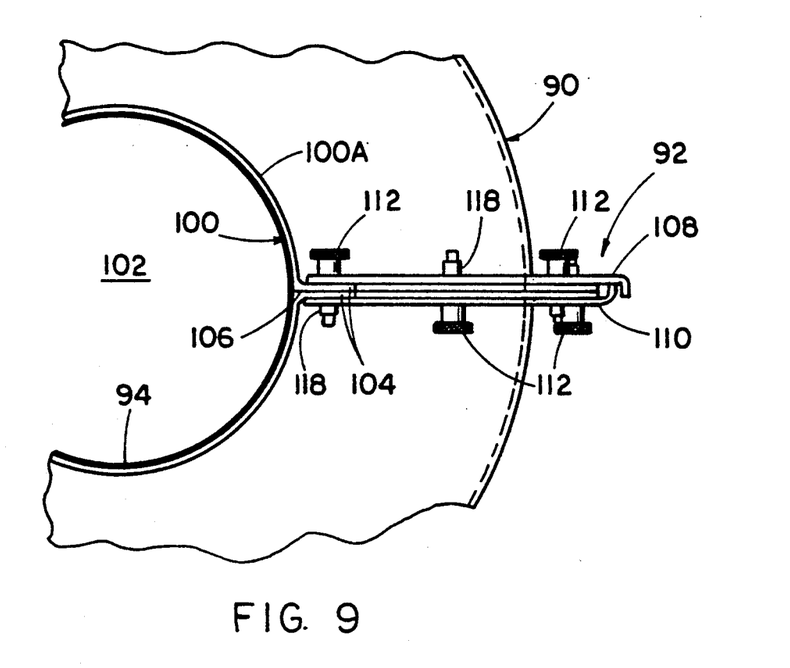
FIG. 9 is a top plan view of flexible boot member and clamp members as seen along line 9—9 of FIG. 8.
Figures 10, 11, 12:
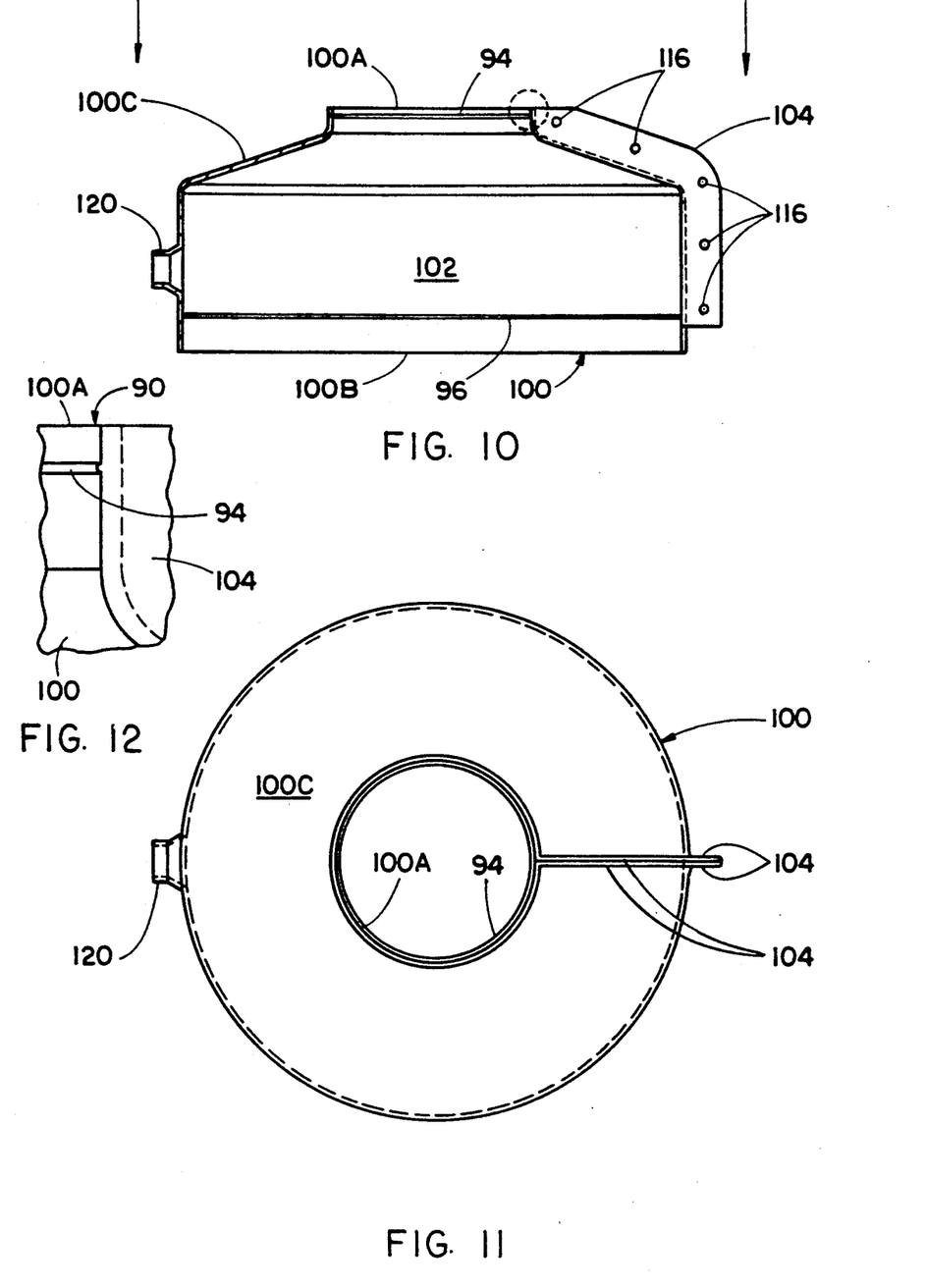
FIG. 10 is an axial sectional view of the flexible boot member of the flexible vacuum seal by itself.
FIG. 11 is a top plan view of the flexible boot member as seen along line 11—11 of FIG. 10.
FIG. 12 is an enlarged view of the circled portion of the flexible boot member in FIG. 10, showing an interior upper circumferential sealing ring on the boot member.
Figure 13:
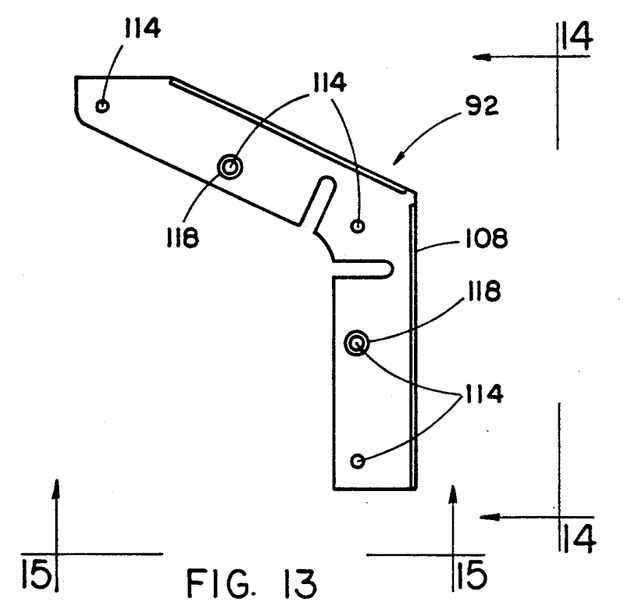
FIG. 13 is a side elevational view of one of the clamp members of the flexible vacuum seal by itself.
Figure 14:
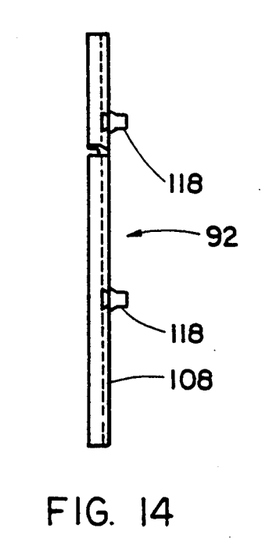
FIG. 14 is an end elevational view of the clamp member as seen along line 14—14 of FIG. 13.
Figure 15:
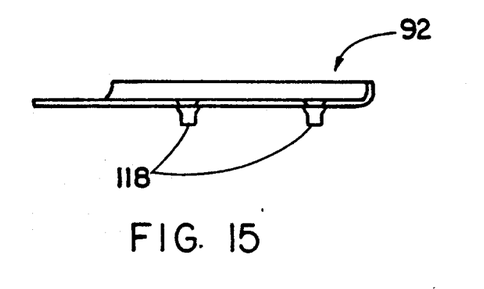
FIG. 15 is a bottom plan view of the clamp member as seen along line 15—15 of FIG. 13.

The flexible boot member 90 of the seal 88 includes a bowl-shaped body 100 (FIGS. 5, 7 and 8). The body 100 has a pair of longitudinally-displaced opposite end portions 100A,100B and defines a hollow cavity 102 (FIG. 10) open at the opposite end portions The body 100 also has a pair of side-by-side longitudinally-extending side portions in the form of flanges 104 defining a split 106 (FIG. 11) in the boot member body 100 along a side thereof. The split 106 extends between the open end portions 100A,100B rendering the body 100 openable at the split 106 for allowing flexing of the boot member 90 between open and closed side configurations to permit its installation and removal on and from the pump housing 30 and shaft 34. The flanges 104 of the boot member 90 project radially outward from and extend longitudinally along opposite sides of the longitudinal split 106 in the body 100. The flanges 104 are disposed in side-by-side contacting relation when the boot member 90 is in its closed configuration as seen in FIGS. 9 and 11 and displaced from one another when the boot member 90 is flexed to its open configuration.

The clamping means 92 of the flexible vacuum seal 88 are operable for releasably and sealably clamping together the flanges 104 of the boot member body 100 at the split 106 to retain the boot member 90 in its closed configuration. As seen in FIGS. 8, 9 and 13-15, the clamping means 92 of the flexible seal 88 includes a pair of brackets 108,110 mountable along outer sides of said flanges 104 on the boot member body 100, and a plurality of fasteners 112 extendible through the brackets. The brackets 108,110 have a series of holes 114 therethrough which are alignable with holes 116 through the flanges 104. Also, nuts 118 are attached to the brackets 108,110 at alternating ones of the holes 114 therein. The fasteners 112 are insertable through the aligned holes 114,116 of the brackets 108,110 and flanges 104. Threading the fasteners 112 into the nuts 118 operates to draw the brackets 108,110 toward one another clamping the flanges 104 therebetween. Unthreading the fasteners 112 from the nuts 118 operates to withdraw the brackets 108,110 away from one another for releasing the flanges 104.

Figure 4:
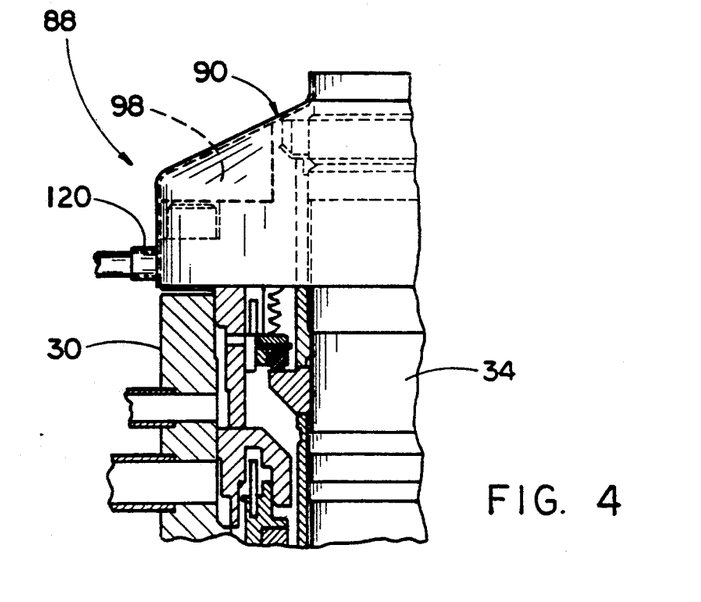
FIG. 4 is a fragmentary view of an upper portion of the axially sectioned sealing housing of the reactor coolant pump of FIG. 3, illustrating in elevational form an auxiliary flexible vacuum seal of the present invention installed about the pump shaft.

Further, the upper and lower sealably engaging portions 94,96 (best seen in FIGS. 10 and 12) on the boot member body 100 at the opposite open end portions 100A,100B thereof are rings being semi-circular in cross-section and projecting radially inwardly, however, as mentioned above, these engaging portions 94,96 may be the interior surface of the boot member body 100. Preferably, the rings 94,96 are formed integrally on the interior surface of the body 100 of the boot member 90, extending circumferentially about the interior and projecting radially inwardly therefrom for sealably engaging the pump housing 30 and shaft 34 when the boot member 90 is installed and flexed to its closed configuration, as seen in FIGS. 4 and 5. The boot member 90 and the sealably engaging rings 94,96 on the opposite end portions 100A,100B thereof are composed of resilient stretchable material such as PVC. The body 90 is in a stretched condition when it is installed and clamped to its closed configuration. In such closed configuration, it permits generation of a vacuum seal condition between the boot member 90 and the pump housing 30 and shaft 34. The body 100 has a port 120 conformable to receive the leakoff 70.

Finally, the boot support member 98 (best seen in FIGS. 5, 6 and 7) of the flexible seal 88 is disposable within the boot member 90 between it and the pump housing 30 for supporting the boot member 90 when in its closed configuration. As shown in FIGS. 4 and 5, the boot support member 98 is entirely enclosed and covered by the boot member 90 such that the boot support member 98 merely provides an internal supporting structure for the boot member 98 but does not need to provide a sealing type of engagement therewith. More particularly, the boot support member 98 is annular in shape and split at 122 such that the member 98 is composed of a pair of semi-circular parts 124. The support member 98 also has an upper surface 98A conformed in shape to the relatively smooth surface of an intermediate portion 100C (FIG. 11) of the boot member body 100 being located between its opposite end portions 100A,100B for engagably supporting the boot member 90 at its intermediate portion. Further, the boot support member 98 has a lower surface 98B conformed in shape to the relatively interrupted shape of the pump housing 30 for mounting the support member 98 thereon.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A method of preparing a reactor coolant pump for vacuum degasification of a reactor coolant system, said preparing method comprising the steps of:
    (a) sealing a seal housing of the reactor coolant pump by, first, installing a boot support member about a portion of the seal housing and, then, installing a flexible longitudinally split boot member about the portion of the seal housing, over the boot support member, and about a shaft extending through the seal housing such that the boot support member is disploased within and entirely enclosed and covered by the boot member between the boot member and the seal housing with the boot support member internally supporting the boot member;

(b) reversing the pressure of the reactor coolant system at start of vacuum degasification of the reactor coolant system, said sealing of the pump seal housing preventing damage to sealing assemblies therein by said reversing of reactor coolant system pressure;

(c) terminating reversing of the reactor coolant system pressure at completion of vacuum degasification of the reactor coolant system; and (d) unsealing the pump seal housing of the reactor coolant pump by removing the split boot member.

2. The method as recited in claim 1, wherein said installing of said split boot member includes stretching the split boot member.

3. The method as recited in claim 1, further comprising:
    terminating operation of the pump before sealing its seal housing.

4. The method as recited in claim 1, further comprising:
    unsealing the pump seal housing before restarting operation of the pump.

* * * * *